(12) United States Patent
Wahlund

(10) Patent No.: US 11,925,244 B2
(45) Date of Patent: Mar. 12, 2024

(54) PORTABLE WALKING STAND ASSEMBLY

(71) Applicant: Ken Wahlund, Eureka, CA (US)

(72) Inventor: Ken Wahlund, Eureka, CA (US)

(*) Notice: Subject to any disclaimer, the term of this patent is extended or adjusted under 35 U.S.C. 154(b) by 136 days.

(21) Appl. No.: 17/708,905

(22) Filed: Mar. 30, 2022

(65) Prior Publication Data

US 2023/0309666 A1  Oct. 5, 2023

(51) Int. Cl.
  *A45B 9/02* (2006.01)
  *F16M 11/04* (2006.01)
  *F16M 11/22* (2006.01)

(52) U.S. Cl.
  CPC ............. *A45B 9/02* (2013.01); *F16M 11/041* (2013.01); *F16M 11/22* (2013.01); *A45B 2200/05* (2013.01)

(58) Field of Classification Search
  CPC .............................. A61H 2003/025; A45B 9/02
  See application file for complete search history.

(56) References Cited

U.S. PATENT DOCUMENTS

| | | | |
|---|---|---|---|
| 3,810,647 A | 5/1974 | Martchenke | |
| 4,786,082 A * | 11/1988 | Swietlik | A45B 5/00 135/66 |
| 5,311,693 A * | 5/1994 | Underwood | F41A 23/06 42/94 |
| 7,905,667 B2 | 3/2011 | Barker | |
| 8,590,440 B2 * | 11/2013 | Gallo | F41A 23/16 89/37.04 |
| 8,960,211 B2 | 2/2015 | Eng | |
| 10,724,681 B2 | 7/2020 | Gearing | |
| 10,856,629 B1 | 12/2020 | Unice | |
| 2003/0042388 A1 * | 3/2003 | Peterson | F16M 13/06 D22/199 |
| 2013/0232844 A1 * | 9/2013 | Gallo | F41A 23/16 42/94 |
| 2016/0135554 A1 * | 5/2016 | Green | A45B 5/00 135/66 |
| 2019/0277593 A1 | 9/2019 | Barr | |
| 2019/0343250 A1 * | 11/2019 | Rau | A45B 3/00 |

* cited by examiner

*Primary Examiner* — Noah Chandler Hawk

(57) ABSTRACT

A portable walking stand assembly includes a pair of walking sticks that is each employable by a respective pair of users thereby facilitating each of the walking sticks to assist the pair of users with walking. A pair of grips is each positioned around a respective one of the walking sticks thereby facilitating a respective user to grip a respective grip. A pair of stops is each positioned around a respective one of the walking sticks to inhibit the respective walking stick from sinking into a support surface. A support is removably attachable to the pair of walking sticks thereby facilitating the pair of walking sticks to elevate the support above a support surface. The support has a pair of arms angling away from each other to support an optical device when the support is attached to the pair of walking sticks.

8 Claims, 4 Drawing Sheets

PORTABLE WALKING STAND ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to walking stand devices and more particularly pertains to a new walking stand device for supporting an optical device. The device includes a pair of walking sticks and a support for an optical device. Each of the walking sticks is attachable to the support thereby defining a bipod to support the optical device.

(2) Description of Related Art Including Information Disclosed Under 37 CFR 1.97 and 1.98

The prior art relates to walking stand devices including a ski pole device that has a coupler for engaging a camera mount. The prior art discloses a walking stick device that includes a tripod integrated into the walking device. The prior art discloses a hiking pole that includes a pair of flexible tethers that can be stood upon by a user such that the hiking pole and the flexible tethers defines a tripod for supporting an optical device. The prior art discloses a tripod device for supporting an optical device. The prior art discloses a walking stick that includes a pair of legs that are pivotally disposed on the walking stick for defining a tripod.

BRIEF SUMMARY OF THE INVENTION

An embodiment of the disclosure meets the needs presented above by generally comprising a pair of walking sticks that is each employable by a respective pair of users thereby facilitating each of the walking sticks to assist the pair of users with walking. A pair of grips is each positioned around a respective one of the walking sticks thereby facilitating a respective user to grip a respective grip. A pair of stops is each positioned around a respective one of the walking sticks to inhibit the respective walking stick from sinking into a support surface. A support is removably attachable to the pair of walking sticks thereby facilitating the pair of walking sticks to elevate the support above a support surface. The support has a pair of arms angling away from each other to support an optical device when the support is attached to the pair of walking sticks.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
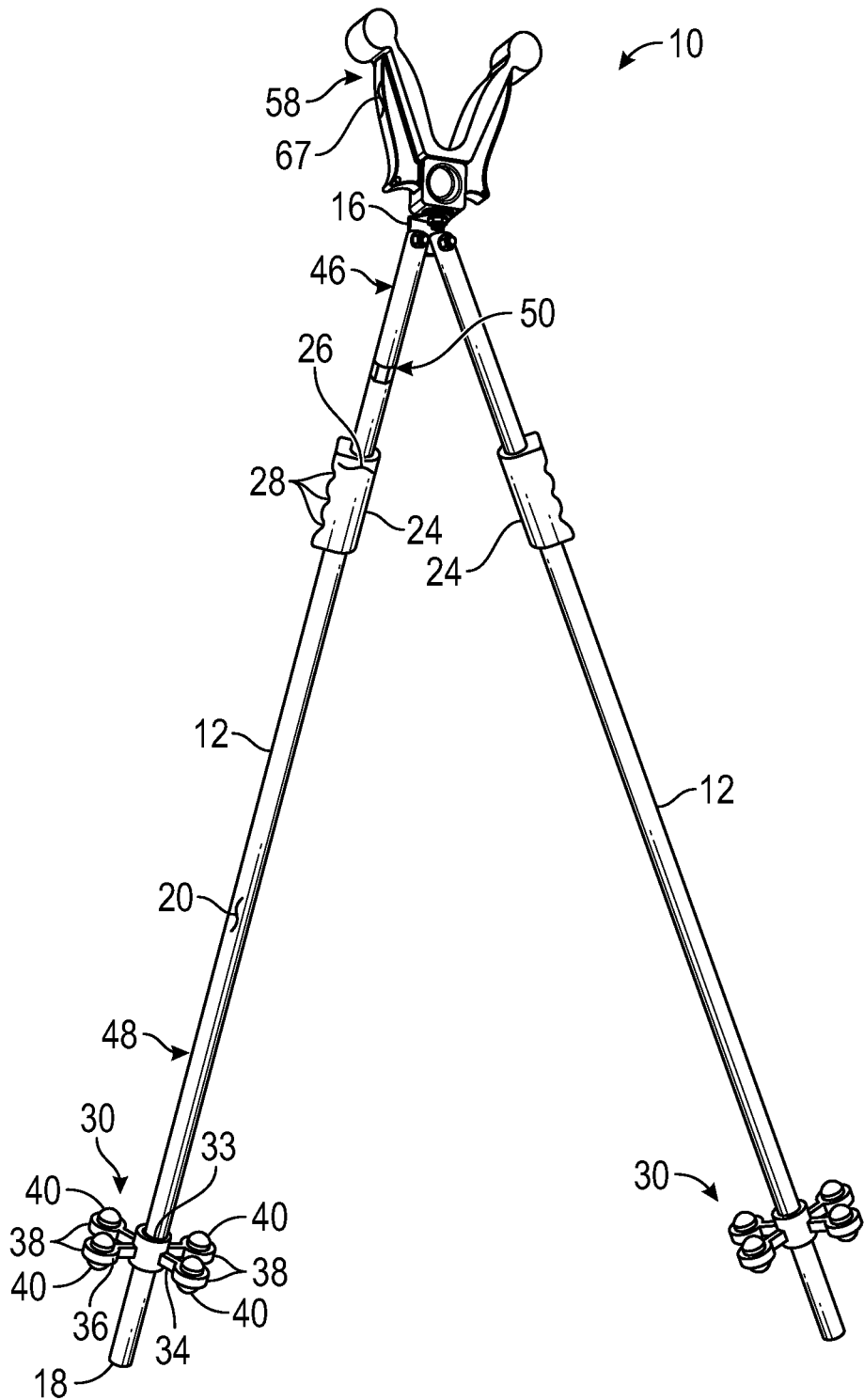
FIG. 1 is a front perspective view of a portable walking stand assembly according to an embodiment of the disclosure.
Figure 2:
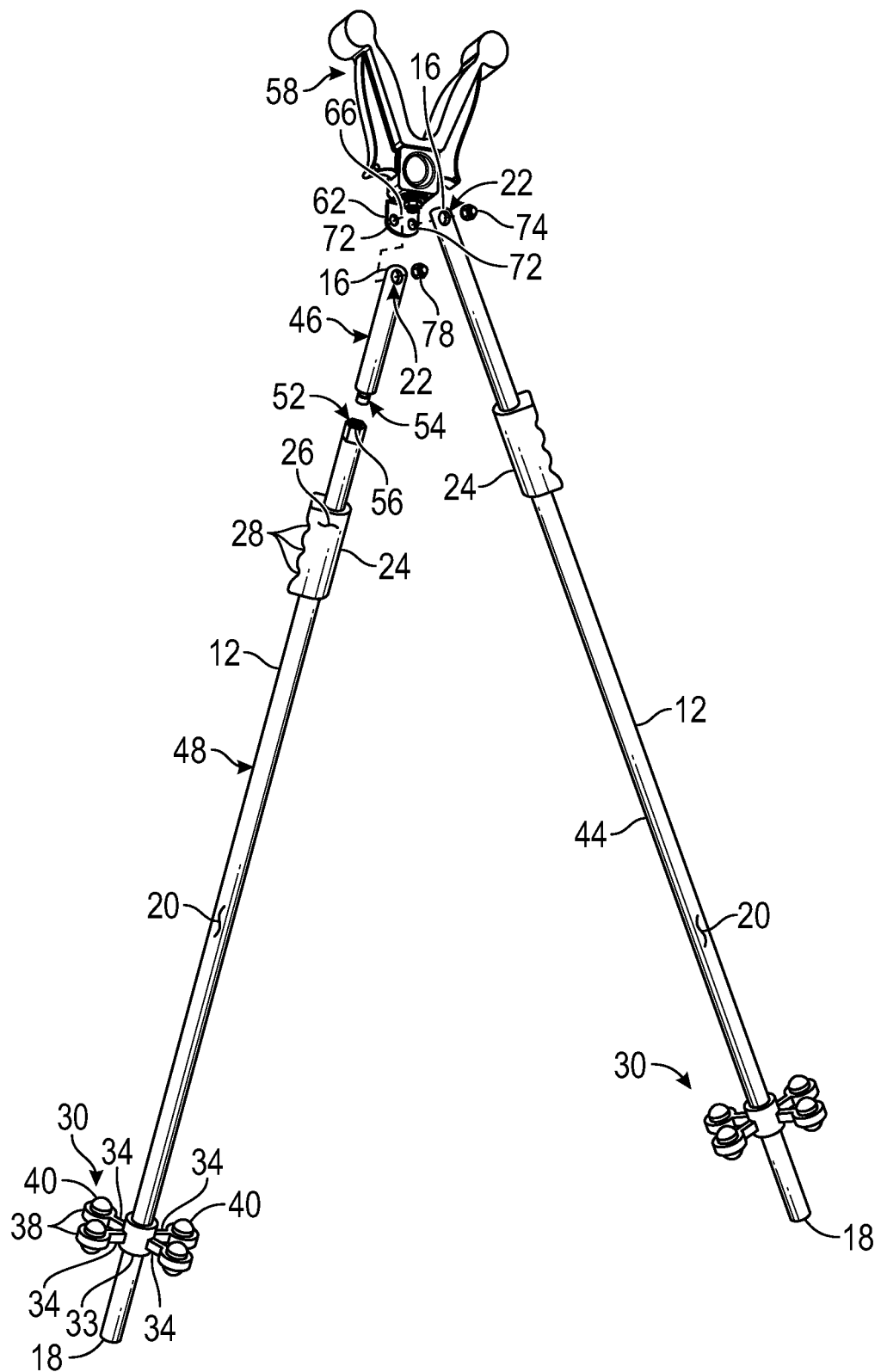
FIG. 2 is an exploded perspective view of an embodiment of the disclosure.
Figure 3:
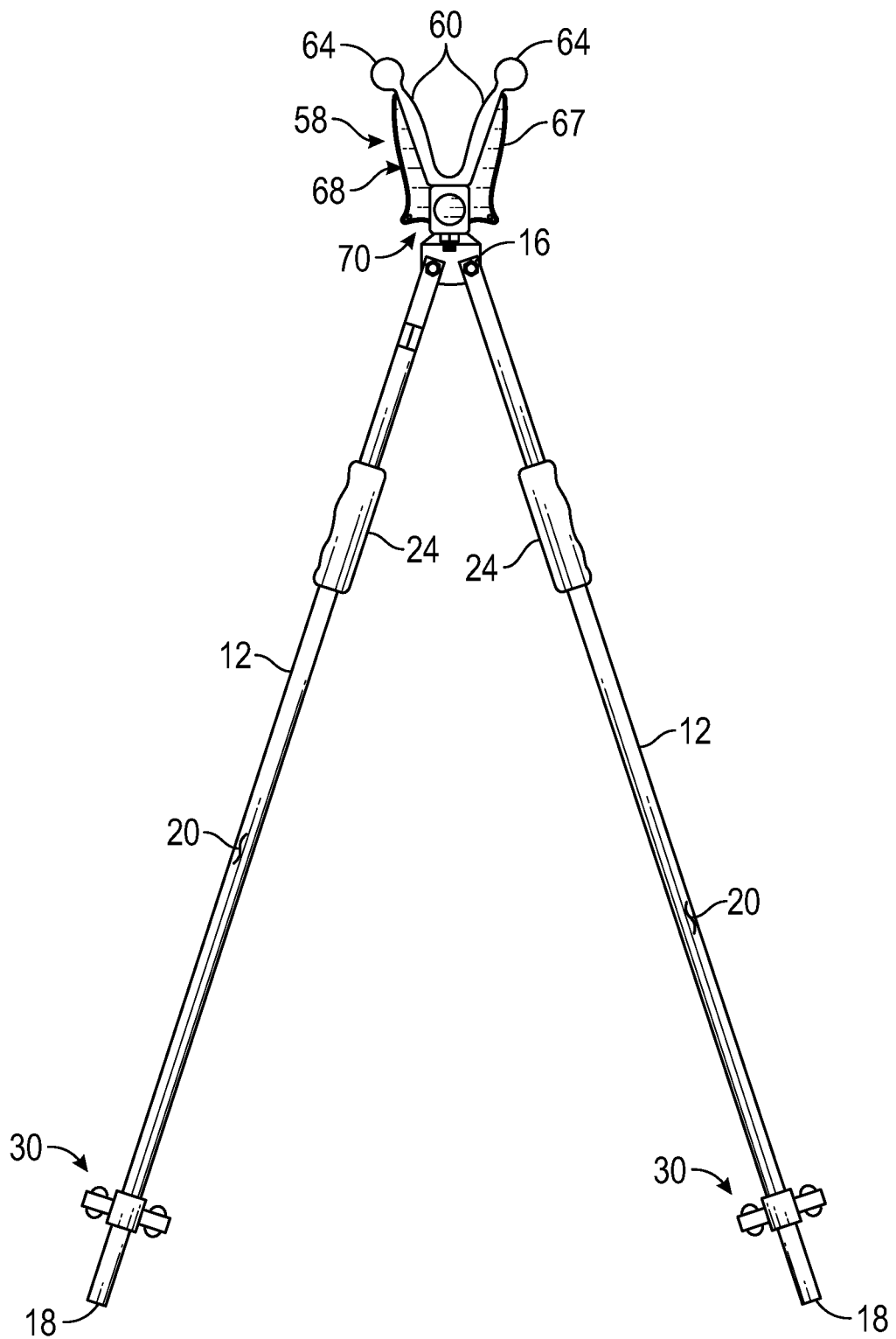
FIG. 3 is a front view of an embodiment of the disclosure.
Figure 4:
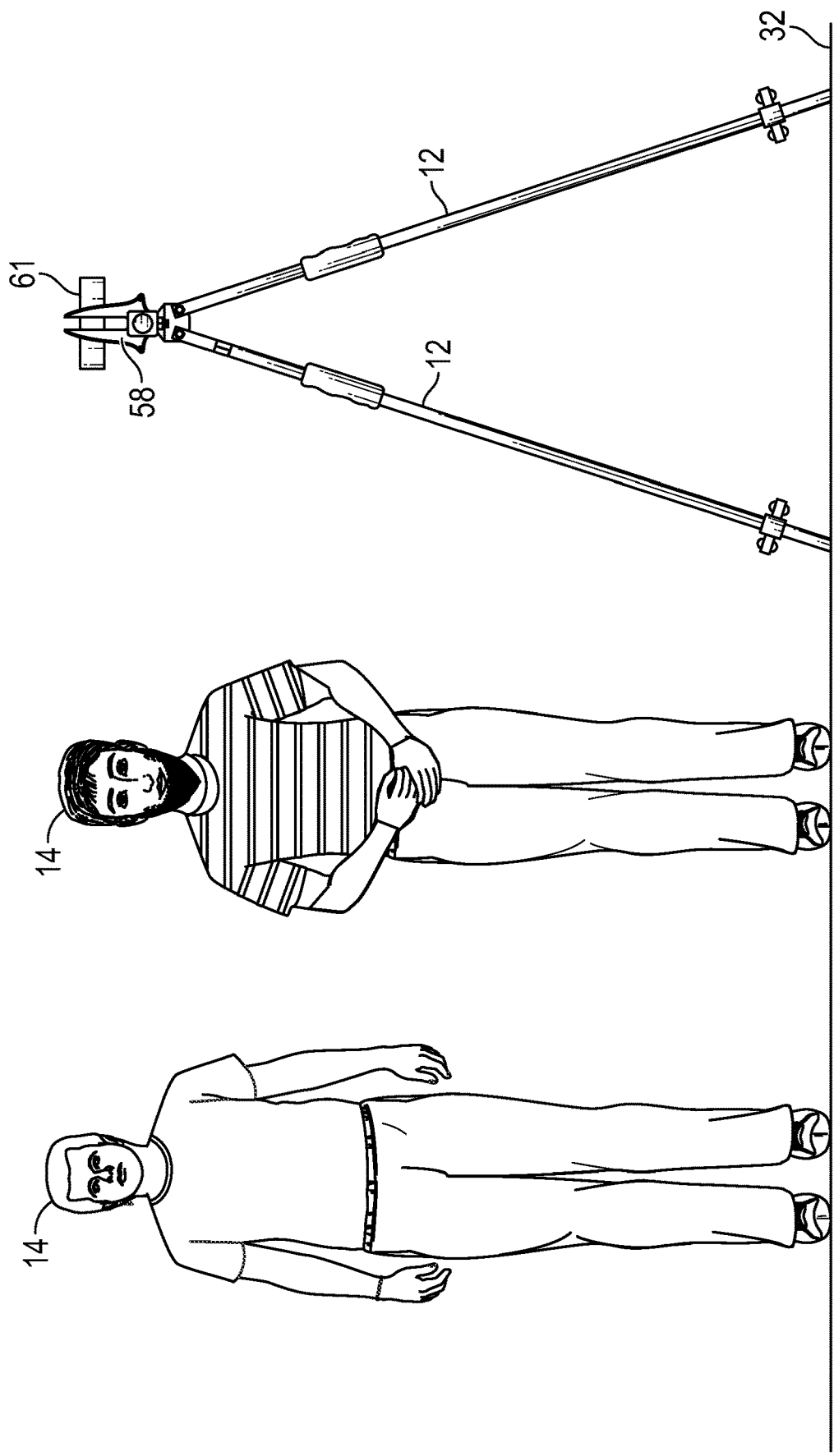
FIG. 4 is a perspective in-use view of an embodiment of the disclosure.

With reference now to the drawings, and in particular to FIGS. 1 through 4 thereof, a new walking stand device embodying the principles and concepts of an embodiment of the disclosure and generally designated by the reference numeral 10 will be described.

As best illustrated in FIGS. 1 through 4, the portable walking stand assembly 10 generally comprises a pair of walking sticks 12 that is each employable by a respective pair of users 14 thereby facilitating each of the walking sticks 12 to assist the pair of users 14 with walking. Each of the walking sticks 12 has an upper end 16, a lower end 18 and an outer surface 20 extending between the upper end 16 and the lower end 18. Furthermore, the outer surface 20 tapers between the upper end 16 and the lower end 18 such that the lower end 18 has a diameter is less than a diameter of the upper end 16. Each of the walking sticks 12 may have a length ranging between approximately 5.0 feet and 6.0 feet and a diameter tapering between approximately 0.625 inches and 0.375 inches.

Each of the walking sticks 12 has an opening 22 extending through the outer surface 20 and the opening 22 in each of the walking sticks 12 extends along an axis that is perpendicularly oriented with an axis extending between the upper end 16 and the lower end 18. Furthermore, the opening 22 in each of the walking sticks 12 is positioned adjacent to the upper end 16. A pair of grips 24 is each positioned around a respective one of the walking sticks 12 thereby facilitating a respective user 14 to grip a respective grip. Each of the grips 24 has an outwardly facing surface 26 and the outwardly facing surface 26 has a series of depressions 28 that are spaced apart from each other and are distributed along a full length of the grips 24 such that each of the depressions 28 in the grips 24 can accommodate the respective user's fingers when the respective user 14 grips the grip 24. Moreover, each of the grips 24 is positioned closer to the upper end 16 than the lower end 18 of the respective walking stick 12 and each of the grips 24 may be comprised of a resiliently compressible material for enhancing comfort when gripping said grips 24.

A pair of stops 30 is each positioned around a respective one of the walking sticks 12 and each of the stops 30 inhibits the respective walking stick 12 from sinking into a support surface 32. Each of the stops 30 comprises a collar 33 extending around the outer surface 20 of the respective walking stick 12 and the collar 33 is positioned closer to the lower end 18 than the upper end 16 of the respective walking stick 12. Each of the stops includes a plurality of arms 34 that each radiates outwardly from the collar 33 and each of the arms 34 has a distal end 36 with respect to the collar 33. Each of the stops 30 includes a plurality of rings 38 that is each coupled to the distal end 36 of a respective one of the arms 34 such that an opening 22 defined by the rings 38 lies on a plane that is oriented parallel to an axis extending between the collar 33 and the distal end 36 of the arms 34. Additionally, each of the stops 30 includes a plurality of balls 40 and each of the balls 40 is positioned in the opening 22 defined by a respective one of the rings 38 such that each of balls 40 extends upwardly and downwardly from the respective ring 38.

The pair of walking sticks 12 includes a first walking stick 42 and a second walking stick 44, and the first walking stick 42 comprises a first section 46 that is removably attachable to a second section 48. The upper end 16 of the first stick is associated with the first section 46 and the lower end 18 of the first walking stick 42 is associated with the second section 48. Furthermore, a threshold 50 between the first section 46 and the second section 48 is positioned between the grip 24 on the first walking stick 42 and the upper end 16 of the first walking stick 42. The threshold 50 of the second section 48 has a well 52 extending downwardly toward the lower end 18 of the first walking stick 42 and the threshold of the first section 46 has a coupler 54 extending downwardly from the threshold 50 of the first section 46. The coupler 54 threadably engages a bounding surface 56 of the well 52 for releasably attaching the first section 46 to the second section 48.

A support 58 is provided and the support 58 is removably attachable to the pair of walking sticks 12 thereby facilitating the pair of walking sticks 12 to elevate the support 58 above a support surface 32. The support surface 32 may be ground or other support surface upon which the users 14 are walking. The support 58 has a pair of arms 60 angling away from each other to support 58 an optical device 61 when the support 58 is attached to the pair of walking sticks 12. The optical device 61 may be a camera, a spotting scope, binoculars, a rifle or any other type of device that is generally required to be supported in a stable position.

The support 58 has a plate 62 extending downwardly from a bottom end 64 of an intersection 65 between the pair of arms 60 of the support 58, and the plate 62 has a first face 66 that lies on a plane which is oriented parallel to a longitudinal axis of the arms 60 of the support 58. Each of the arms 60 of the support 58 has a distal end 64 with respect to the intersection 65 between the arms 60 of the support 58 and the distal end 64 of each of the arms 60 of the support 58 is rounded such that the distal end 64 of each of the arms 60 of the support 58 defines a circular shape. Each of the arms 60 of the support 58 has an outwardly facing surface 67 with respect to each other, and the outwardly facing surface 67 of each of the arms 60 of the support 58 has a first portion 68 extending downwardly toward the intersection 65 between the arms 60 of the support 58. The outwardly facing surface 67 of each of the arms 60 of the support 58 has a second portion 70 that is perpendicularly oriented with the first portion 68 such that the second portion 70 extends inwardly toward the intersection between the arms 60 of the support 58 at a point located adjacent to the bottom end 64 of the intersection 65.

The plate 62 has a pair of bolts 72 each extending away from the first face 66 of the plate 62 and the bolts 72 are spaced apart from each other and are distributed laterally along the first face 66. Each of the bolts 72 is extendable through the opening 22 in a respective one of the walking sticks 12 for attaching the walking sticks 12 to the support 58. A pair of nuts 74 is provided and each of the nuts 74 is threadable onto a respective one of the bolts 72 for retaining the respective walking stick 12 on the respective bolt 72. Each of the walking sticks 12 may be attachable to any type of steadying mount, including a rifle pod for mounting a hunting rifle such as a Steady-Pod manufactured by Shooters Ridge LLC, 12851 Peach Grove Road, Alexandria, KY, 4100, or any other type of bipod device that is commonly employed for steadying optical devices.

In use, each of the walking sticks 12 is employed during hiking or walking in the traditional convention of employing walking sticks 12. Each of the walking sticks 12 can be attached to the support 58 at any time that the users 14 wish to employ an optical device. In this way each of the walking sticks 12 and the support 58 can define a bipod for mounting the steadying the optical device. Thus, the optical device 61 can be quickly deployed and mounted in a steadied manner for viewing wildlife, geographical features or any other object that the users 14 may wish to observe. In this way the users 14 can easily transport the support 58 during hiking activities or other activities that find the users 14 outdoors.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable walking stand assembly to assist a pair of users with walking or for supporting an optical device, said assembly comprising:

a pair of walking sticks, each of said walking sticks being employable by a respective pair of users thereby facilitating each of said walking sticks to assist the pair of users with walking;

a pair of grips, each of said grips being positioned around a respective one of said walking sticks thereby facilitating a respective user to grip a respective grip;

a pair of stops, each of said stops being positioned around a respective one of said walking sticks wherein each of said stops is configured to inhibit said respective walking stick from sinking into a support surface;

a support being removably attachable to said pair of walking sticks thereby facilitating said pair of walking sticks to elevate said support above a support surface, said support having a pair of arms angling away from each other wherein each of said arms is configured to support a optical device when said support is attached to said pair of walking sticks;

wherein each of said walking sticks has an upper end, a lower end and an outer surface extending between said upper end and said lower end, said outer surface tapering between said upper end and said lower end such that said lower end has a diameter being less than a diameter of said upper end;

wherein each of said walking sticks has an opening extending through said outer surface, said opening in each of said walking sticks extending along an axis being perpendicularly oriented with an axis extending between said upper end and said lower end, said opening in each of said walking sticks being positioned adjacent to said upper end; and wherein each of said stops comprises
  a collar extending around said outer surface of said respective walking stick, said collar being positioned closer to said lower end than said upper end of said respective walking stick;
  a plurality of arms, each of said arms radiating outwardly from said collar, each of said arms having a distal end with respect to said collar;
  a plurality of rings, each of said rings being coupled to said distal end of a respective one of said arms such that an opening defined by said rings lies on a plane being oriented parallel to an axis extending between said collar and said distal end of said arms; and
  a plurality of balls, each of said balls being positioned in said opening defined by a respective one of said rings such that each of balls extends upwardly and downwardly from said respective ring.

2. The assembly according to claim 1, wherein each of said grips has an outwardly facing surface, said outwardly facing surface having a series of depressions being spaced apart from each other and being distributed along a full length of said grips such that each of said depressions in said grips can accommodate the respective user's fingers when the respective user grips said grip, each of said grips being positioned closer to said upper end than said lower end of said respective walking stick.

3. The assembly according to claim 1, wherein wherein said pair of walking sticks includes a first walking stick and a second walking stick, said first walking stick comprising a first section being removably attachable to a second section, said upper end of said first stick being associated with said first section, said lower end of said first walking stick being associated with said second section, a threshold between said first section and said second section being positioned between said grip on said first walking stick and said upper end of said first walking stick.

4. The assembly according to claim 2, wherein said threshold of said second section has a well extending downwardly toward said lower end of said first walking stick, said threshold of said first section having a coupler extending downwardly from said threshold of said first section, said coupler threadably engaging a bounding surface of said well for releasably attaching said first section to said second section.

5. The assembly according to claim 1, wherein said support has a plate extending downwardly from a bottom end of an intersection between said pair of arms, said plate having a first face lying on a plane being oriented parallel to a longitudinal axis of said arms, each of said arms having a distal end with respect to said intersection between said arms, said distal end of each of said arms being rounded such that said distal end of each of said arms defines a circular shape.

6. The assembly according to claim 5, wherein each of said arms has an outwardly facing surface with respect to each other, said outwardly facing surface of each of said arms having a first portion extending downwardly toward said intersection between said arms and a second portion being perpendicularly oriented with said first portion such that said second portion extends inwardly toward said intersection between said arms at a point located adjacent to said bottom end of said intersection.

7. The assembly according to claim 5, wherein:
  each of said walking sticks has an opening extending therethrough; and
  said plate has a pair of bolts each extending away from said first face of said plate, said bolts being spaced apart from each other and being distributed laterally along said first face, each of said bolts being extendable through said opening in a respective one of said walking sticks for attaching said walking sticks to said support.

8. A portable walking stand assembly to assist a pair of users with walking or for supporting an optical device, said assembly comprising:
  a pair of walking sticks, each of said walking sticks being employable by a respective pair of users thereby facilitating each of said walking sticks to assist the pair of users with walking, each of said walking sticks having an upper end, a lower end and an outer surface extending between said upper end and said lower end, said outer surface tapering between said upper end and said lower end such that said lower end has a diameter being less than a diameter of said upper end, each of said walking sticks having an opening extending through said outer surface, said opening in each of said walking sticks extending along an axis being perpendicularly oriented with an axis extending between said upper end and said lower end, said opening in each of said walking sticks being positioned adjacent to said upper end;
  a pair of grips, each of said grips being positioned around a respective one of said walking sticks thereby facilitating a respective user to grip a respective grip, each of said grips having an outwardly facing surface, said outwardly facing surface having a series of depressions being spaced apart from each other and being distributed along a full length of said grips such that each of said depressions in said grips can accommodate the respective user's fingers when the respective user grips said grip, each of said grips being positioned closer to said upper end than said lower end of said respective walking stick;

a pair of stops, each of said stops being positioned around a respective one of said walking sticks wherein each of said stops is configured to inhibit said respective walking stick from sinking into a support surface, each of said stops comprising:
  a collar extending around said outer surface of said respective walking stick, said collar being positioned closer to said lower end than said upper end of said respective walking stick;
  a plurality of arms, each of said arms radiating outwardly from said collar, each of said arms having a distal end with respect to said collar;
  a plurality of rings, each of said rings being coupled to said distal end of a respective one of said arms such that an opening defined by said rings lies on a plane being oriented parallel to an axis extending between said collar and said distal end of said arms; and
  a plurality of balls, each of said balls being positioned in said opening defined by a respective one of said rings such that each of balls extends upwardly and downwardly from said respective ring;
wherein said pair of walking sticks includes a first walking stick and a second walking stick, said first walking stick comprising a first section being removably attachable to a second section, said upper end of said first stick being associated with said first section, said lower end of said first walking stick being associated with said second section, a threshold between said first section and said second section being positioned between said grip on said first walking stick and said upper end of said first walking stick, said threshold of said second section having a well extending downwardly toward said lower end of said first walking stick, said threshold of said first section having a coupler extending downwardly from said threshold of said first section, said coupler threadably engaging a bounding surface of said well for releasably attaching said first section to said second section;
a support being removably attachable to said pair of walking sticks thereby facilitating said pair of walking sticks to elevate said support above a support surface, said support having a pair of arms angling away from each other wherein each of said arms is configured to support a optical device when said support is attached to said pair of walking sticks, said support having a plate extending downwardly from a bottom end of an intersection between said pair of arms, said plate having a first face lying on a plane being oriented parallel to a longitudinal axis of said arms, each of said arms having a distal end with respect to said intersection between said arms, said distal end of each of said arms being rounded such that said distal end of each of said arms defines a circular shape, each of said arms having an outwardly facing surface with respect to each other, said outwardly facing surface of each of said arms having a first portion extending downwardly toward said intersection between said arms and a second portion being perpendicularly oriented with said first portion such that said second portion extends inwardly toward said intersection between said arms at a point located adjacent to said bottom end of said intersection, said plate having a pair of bolts each extending away from said first face of said plate, said bolts being spaced apart from each other and being distributed laterally along said first face, each of said bolts being extendable through said opening in a respective one of said walking sticks for attaching said walking sticks to said support; and
a pair of nuts, each of said nuts being threadable onto a respective one of said bolts for retaining said respective walking stick on said respective bolt.

\* \* \* \* \*